US008782545B2

(12) United States Patent
Creasor et al.

(10) Patent No.: US 8,782,545 B2
(45) Date of Patent: Jul. 15, 2014

(54) SYSTEM AND METHOD FOR MANIPULATING MULTIPLE CLIP ITEMS OF DATA

(75) Inventors: Monte Creasor, Sydenham (CA); David Delorey, Ottawa (CA); Richard Mutzke, Ottawa (CA); Donald Slaunwhite, Ottawa (CA)

(73) Assignee: Corel Corporation, Ottawa (CA)

( * ) Notice: Subject to any disclaimer, the term of this patent is extended or adjusted under 35 U.S.C. 154(b) by 1844 days.

(21) Appl. No.: 10/303,399

(22) Filed: Nov. 25, 2002

(65) Prior Publication Data

US 2004/0100496 A1    May 27, 2004

(30) Foreign Application Priority Data

Nov. 18, 2002    (CA) .................................. 2412001

(51) Int. Cl.
*G06F 3/00*    (2006.01)
*G06F 9/00*    (2006.01)
*G06F 17/00*    (2006.01)

(52) U.S. Cl.
USPC ......................................... 715/769; 715/764

(58) Field of Classification Search
USPC .................................................. 715/769, 764
See application file for complete search history.

(56) References Cited

U.S. PATENT DOCUMENTS

| 5,752,254 A | 5/1998 | Sakairi ........................ 707/530 |
| 5,911,066 A | 6/1999 | Williams et al. ............. 395/680 |
| 5,926,633 A | 7/1999 | Takagi et al. ................ 395/566 |
| 5,964,834 A | 10/1999 | Crutcher ...................... 709/213 |
| 6,065,012 A * | 5/2000 | Balsara et al. ............... 707/102 |
| 6,177,935 B1 | 1/2001 | Munn ........................... 345/335 |
| 6,177,939 B1 | 1/2001 | Blish et al. .................. 345/346 |
| 6,983,328 B2 * | 1/2006 | Beged-Dov et al. ......... 709/230 |

FOREIGN PATENT DOCUMENTS

WO    WO 00/73902 A1    7/2000    ................ G06F 9/46

OTHER PUBLICATIONS

"Special Edition Using Microsoft Office 2000", May 1999, pp. 138-145.*

* cited by examiner

*Primary Examiner* — Boris Pesin
*Assistant Examiner* — Sabrina Greene
(74) *Attorney, Agent, or Firm* — Patterson & Sheridan LLP

(57) ABSTRACT

A clip book system communicates with an operating system which controls temporal buffering of each clip item in a buffer. It requests the operating system to notify when a clip item of data is placed into the buffer and receives notifications from the operating system. When a notification is received, a data entry controller copies each clip item of data from the buffer into a selected section of a local memory. An information adder adds item information to the copied clip item of data.

39 Claims, 9 Drawing Sheets

SYSTEM AND METHOD FOR MANIPULATING MULTIPLE CLIP ITEMS OF DATA

This invention relates generally to a method and system for manipulating multiple slip items of data.

BACKGROUND OF THE INVENTION

Many existing operating systems provide a user with a single buffer in which a clip item of data can be stored temporarily. Using the buffer, the user can copy a clip item of data from one location to another. A clip item of data may be a section of text or image, a file in user's folder, or a folder. The buffer is often called a "clipboard". Many word processors and other application programs use a clipboard for cutting and pasting. When the user selects an item of data and performs a Copy or Cut operation, the temporary buffer is created. The operating system through the word processor or other application copies the selected clip item of data to the buffer. When the user pastes the copied clip item at a selected location, the operating system copies it from the buffer to the selected location. The buffer is overwritten every time the user performs the Copy or Cut operation. Accordingly, the user is not able to easily save more than one clip item of data at a time, consistently across all operating systems.

There exist multiple clipboard capabilities within existing applications. However, the copying and pasting is limited to those applications. For example, in the Legal Edition (trademark of Corel Corporation) of WordPerfect Office 2000 (trademark of Corel Corporation), there exists a multiple clipboard, but it is limited to 26 clip items, and data copied there cannot be pasted into other applications.

Also, there exist some clipboard applications that can be used to copy data from one application to another. Some clipboard applications show symbols of multiple clip items clipped in a clipboard to notify the user. However, the user needs to remember what are stored in the clipboard prior to using the clips, which often prevents easy access to the stored clip items.

It is therefore desirable to provide a mechanism which can provide a better way of manipulating multiple clip items of data.

SUMMARY OF THE INVENTION

It is an object of the invention to provide a novel system and method for providing a mechanism for manipulating clip items of data that obviates or mitigates at least one of the disadvantages of existing systems.

The present invention uses a mechanism that allows a user to control saving of multiple clip items in a memory and adding information to the clip items.

In accordance with an aspect of the present invention, there is provided a clip book system for storing multiple clipboards, which store multiple clip items of data in a local memory. The clip book system comprises an OS communicating unit, a data entry controller and an information adder. The OS communicating unit is provided for communicating with an operating system which controls temporal buffering of each clip item in a buffer, for requesting the operating system to notify when a clip item of data is placed into the buffer and receiving notifications from the operating system. The data entry controller copies, in response to each notification, each clip item of data from the buffer into a selected section of the local memory. The information adder adds item information to the copied clip item of data.

In accordance with another aspect of the present invention, there is provided a clip book system for storing multiple clip items of data in a local memory. The clip book system comprises an OS communicating unit, a data entry controller and a sharing controller. The OS communicating unit is provided for communicating with an operating system which controls temporal buffering of each clip item in a buffer, for requesting the operating system to notify when a clip item of data is placed into the buffer and receiving notifications from the operating system. The data entry controller copies, in response to each notification, each clip item of data from the buffer into a selected section of the local memory. The sharing controller sets a sharing property to the copied clip item of data, the sharing property selectively allowing the copied clip item of data to be shared by one or more other users.

In accordance with another aspect of the present invention, there is provided a method for storing multiple clip items of data in a local memory. The method comprises steps of requesting an operating system, which controls temporal buffering of each clip item in a buffer, to notify when a clip item of data is placed into the buffer; receiving a notification from the operating system; copying each clip item of data from the buffer into a selected section of the local memory in response to each notification; and adding item information to the copied clip item of data.

In accordance with another aspect of the present invention, there are provided electronic signals for use in the execution in a computer of the method for storing multiple clip items of data in a local memory.

In accordance with another aspect of the present invention, there is provided electronic signals for use in the execution in a computer of the method for storing multiple clip items of data in a local memory.

In accordance with another aspect of the present invention, there is provided a computer program product for use in the execution in a computer of a method for storing multiple clip items of data in a local memory. The computer program product comprises a module for requesting an operating system, which controls temporal buffering of each clip item in a buffer, to notify when a clip item of data is placed into the buffer; a module for receiving a notification from the operating system; a module for copying each clip item of data from the buffer into a selected section of the local memory in response to each notification; and a module for adding item information to the copied clip item of data.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

Figure 1:
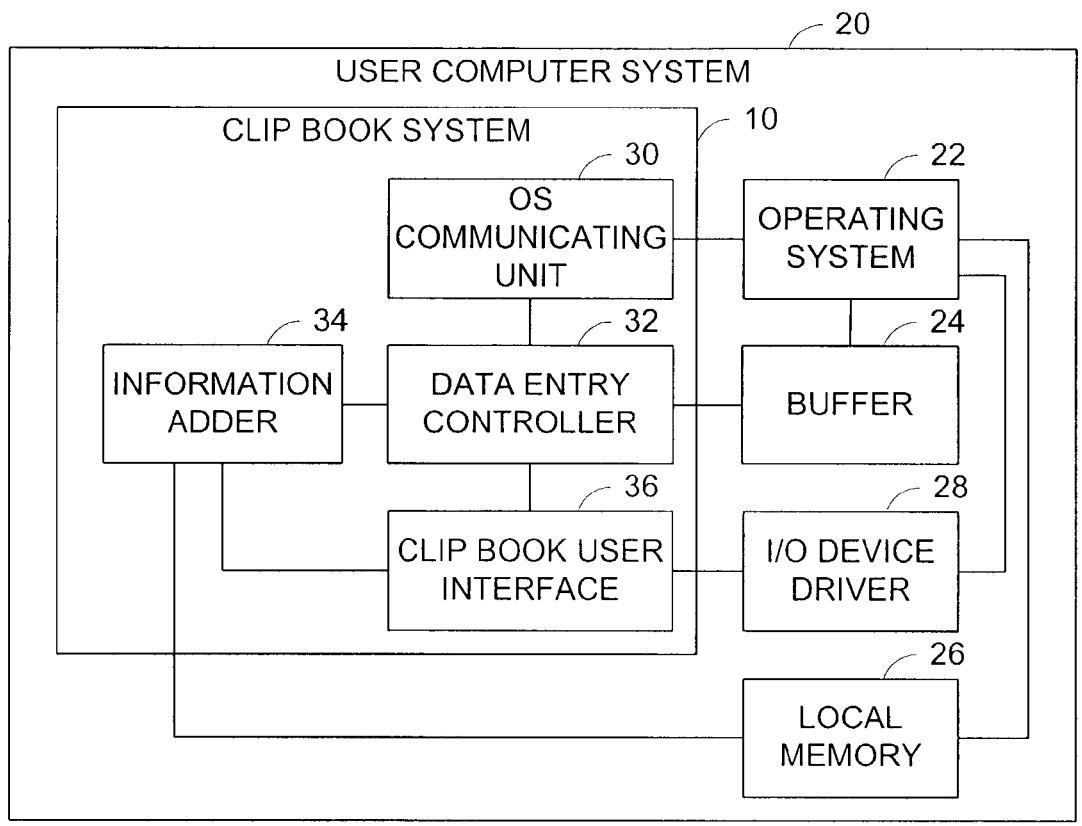
FIG. 1 is a block diagram showing a clip book system in accordance with an embodiment of the invention.

Referring to FIG. 1, a clip book system 10 in accordance with an embodiment of the present invention is described. The clip book system 10 is suitably used in a user computer system 20. The computer system 20 has a buffer 24 for temporary holding data and a local memory 26 for storing data. The buffer 24 is often called a clipboard. The computer system 20 also has an Input/Output (I/O) device driver or drivers 28 for driving input/output devices, such as a keyboard, mouse, touch screen, display monitor, printer and/or external communication ports. An operating system 22 is running on the computer system 20 to control the buffer 14, local memory 26 and I/O device drivers 28.

The computer system 20 also has one or more application programs (not shown). During the use of an application program, a user may copy a clip item of data into the buffer for pasting it at a selected location. The operating system 22 controls such temporal buffering of clip items of data into the buffer 24.

The clip book system 10 runs in the background in the computer system 20, and invisible to the user. The clip book system 10 has an OS communicating unit 30, a data entry controller 32 and an information adder 34. The OS communicating unit 30 communicates with the operating system 22 of the computer system 20. The data entry controller 32 controls data entry from the buffer 24 into the local memory 26. The information adder 34 handles addition of information to the data being entered into the local memory 26.

Figure 2:
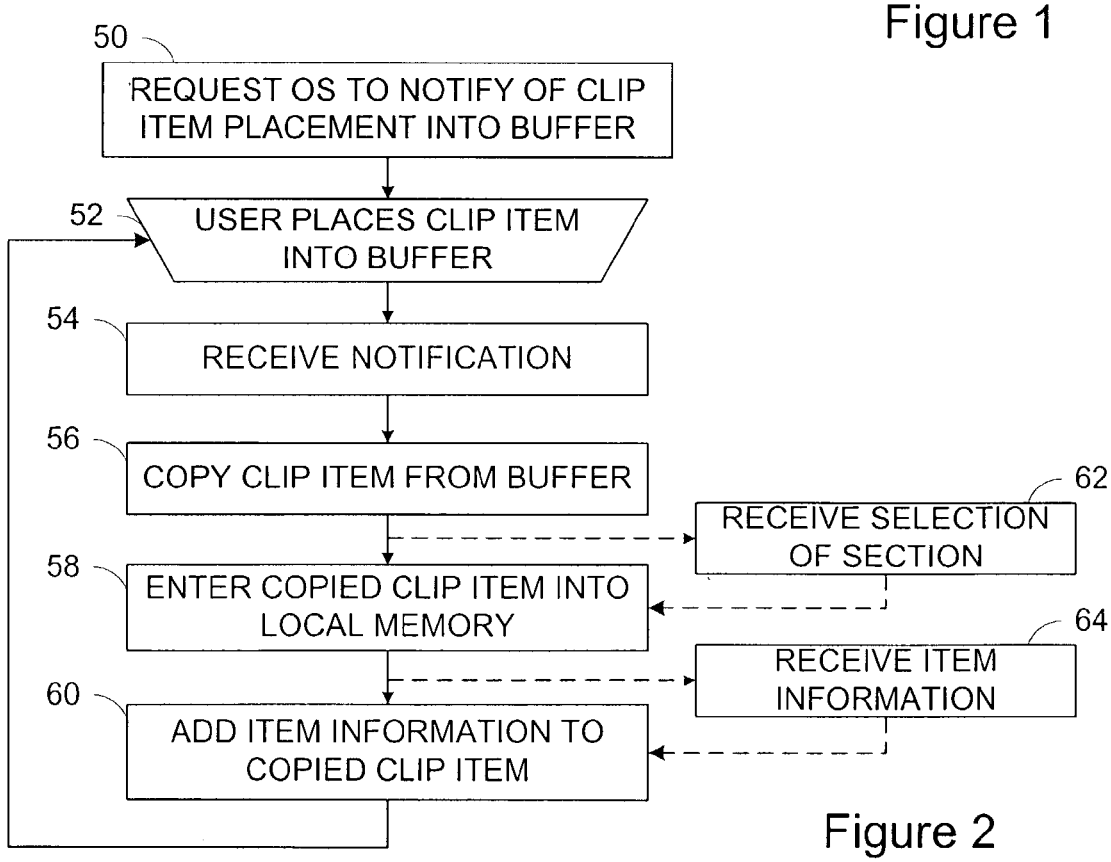
FIG. 2 is a flowchart showing an example of the operation of the clip book system.

Referring now to FIG. 2, the operation of the clip book system 10 is described. During initialization of the clip book system 10 or when a predetermined event occurs, the OS communicating unit 30 of the clip book system 10 requests the operating system 22 to notify when a clip item of data is placed into the buffer 24 (50).

When a clip item of data is placed into the buffer 24 (52), the OS communicating unit 30 receives a notification from the operating system 22 (54). In response to the notification, the data entry controller 32 copies the clip item of data from the buffer 24 (56) and enters the copied clip item of data into a selected section of the local memory 26 (58). The information adder 34 adds item information to the copied clip item of data (60). In FIG. 1, the information adder 34 is shown between the data entry controller 32 and the local memory 26 to schematically illustrates that the item information is added to the clip item which is being entered into the local memory 26. However, the information adder 34 may be provided differently such that the item information is added after the clip item is entered into the local memory 26.

The steps 52-60 are repeated each time a clip item of data is placed into the buffer 24.

At step 58, the data entry controller 32 may enter the copied clip item automatically into a next available section of the local memory 26, or prompt the user to designate a specific section of the local memory 26 into which the clip item of data is entered (62).

To this end, it is preferable that the clip book system 10 has a clip book user interface 36 as shown in FIG. 1. The clip book system 10 preferably has a clip book user interface 36. The clip book user interface 36 allows the user to specify a section in the local memory 26 into which a clip item of data should be stored.

The item information may be any information which can identify the clip item or based on which the clip item can be searched. For example, item information may be a name, one or more descriptions and/or one or more key words.

At step 60, the information adder 34 may automatically create item information. For example, the information adder 34 may use a sequential number, or use the first pat of the data in the copied clip item, as the name of the clip item. Alternatively, the item information may be defined by the user. In that case, the clip book system 10 may be configured such that, prior to adding the item information (60), the information adder 34 prompts the user to enter the item information through the clip book user interface 36 (64).

The user may preset the configuration of the clip book system 10 through the clip book user interface 36 to set whether the clip book system 10 prompts the user at steps 62 and 64.

The information adder 34 may also allow the user to modify, through the clip book user interface 36, the item information of clip items stored in the local memory 26.

The data entry controller 32 may enter each clip item of data in the local memory in a file structure. The item information is stored as part of the file for its associated clip item of data.

As the user places multiple clip items of data into the buffer 24, the clip book system 10 repeats the above steps. As a result, multiple clip items of data are entered into the local memory 26. The data entry controller 32 may enter multiple clip items in a categorised manner into one or more groups. Each group may be called a "clip book".

When multiple groups are stored in the local memory 26, it is desirable that the information adder 34 also adds group information to each group, such as a name, descriptions and/or key words. The information adder 34 may automatically create group information, or prompt the user to enter the group information.

Another embodiment of the invention allows users to search clip items stored in one or more memories.

Figure 3:
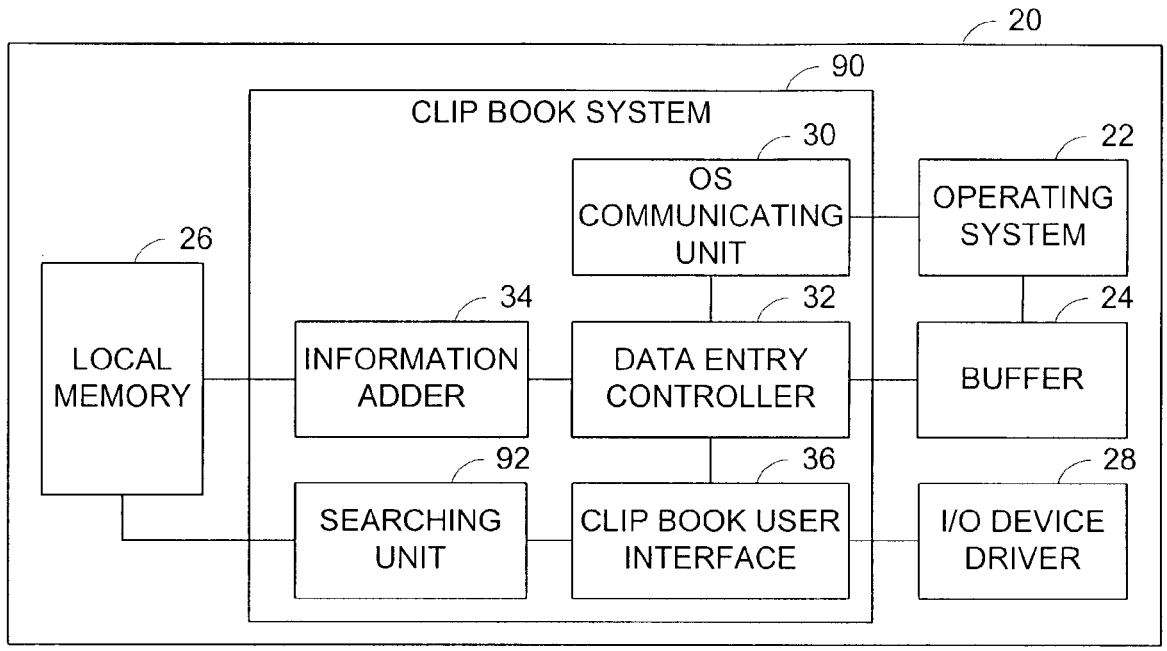
FIG. 3 is a block diagram showing a clip book system in accordance with another embodiment of the invention.

FIG. 3 shows a clip book system 90 according to this embodiment. The clip book system 80 has a searching unit 92 in addition to OS communicating unit 30, data entry controller 32 and information adder 34 similar to those described with reference to FIG. 1.

The searching unit 92 allows a user to search desired clip items stored in the local memory 26 using the item information added to the clip items. When the clip items are filed in a file structure, the searching unit 92 may use standard file searching techniques to search clip items.

The searching unit 92 provides the user, via the clip book user interface 36, a dialog that allows the user to enter the search criteria. For example, the search criteria may be a text string and/or an option for specifying whether the user wants to search the name, description and/or key words. The search criteria may also include the range of search, e.g., the user may specify which clip books are to be searched. Thus, the user is presented with a mechanism for identifying clip items matching with the search criteria.

Figure 4:
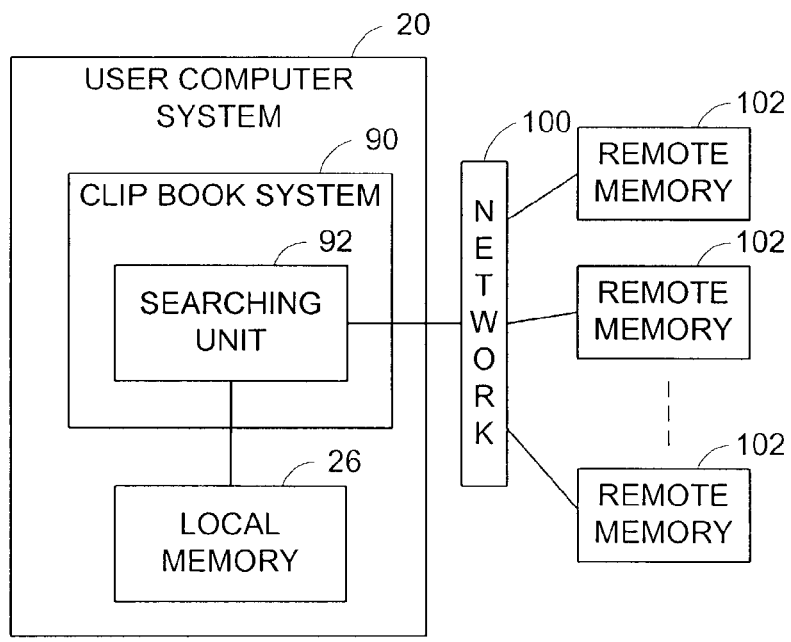
FIG. 4 is a block diagram showing the clip book system used on a network.

As shown in FIG. 4, the user computer system 20 may be connected to a network as schematically illustrated as a box 100. The network 100 may be a local area network or wide area network or Intranet. In that case, the searching unit 82 may allow the user to search clip items stored in one or more remote memories 102 on the network 100. Herein, the term "remote" does not necessarily mean physically distant. A remote memory 102 may exist adjacent to the local memory, but in a different computer system. A remote memory 102 is typically provided in a computer system having a searching unit similar to the searching unit 92. The computer system 20 may be connected to the remote memories 102 directly or through one or more other elements on the network 100.

When the searching unit 92 is capable of directly or indirectly searching remote memories, the user may specify as search criteria whether one or more remote clip books in remote memories 102 are to be searched.

Figure 5:
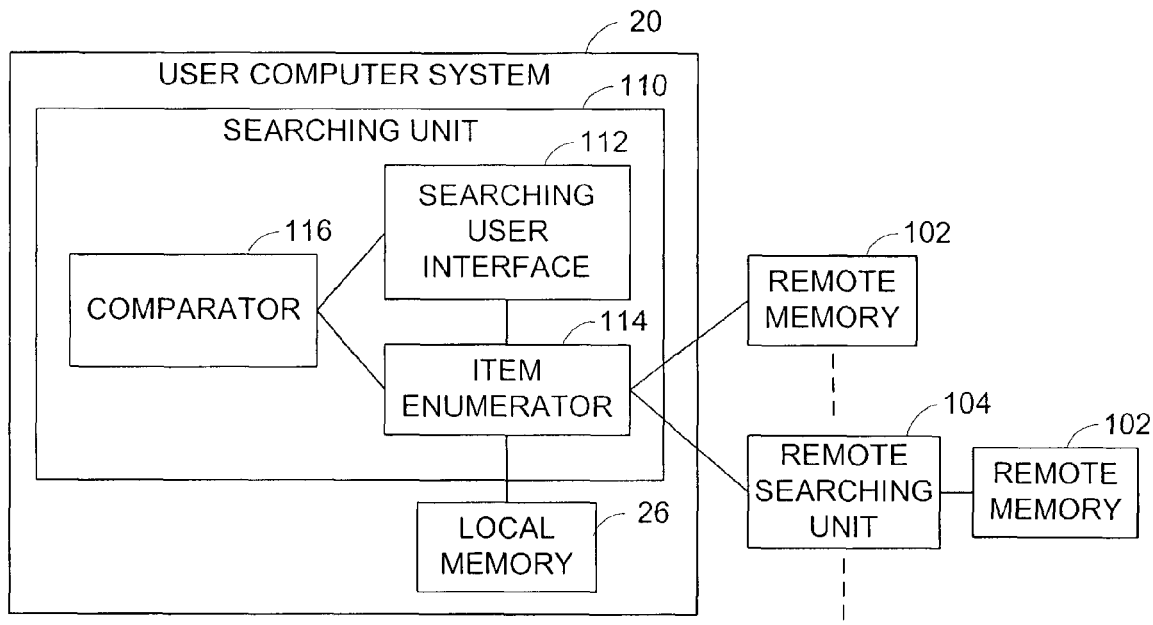
FIG. 5 is a block diagram showing an example of a searching unit.
Figure 6:
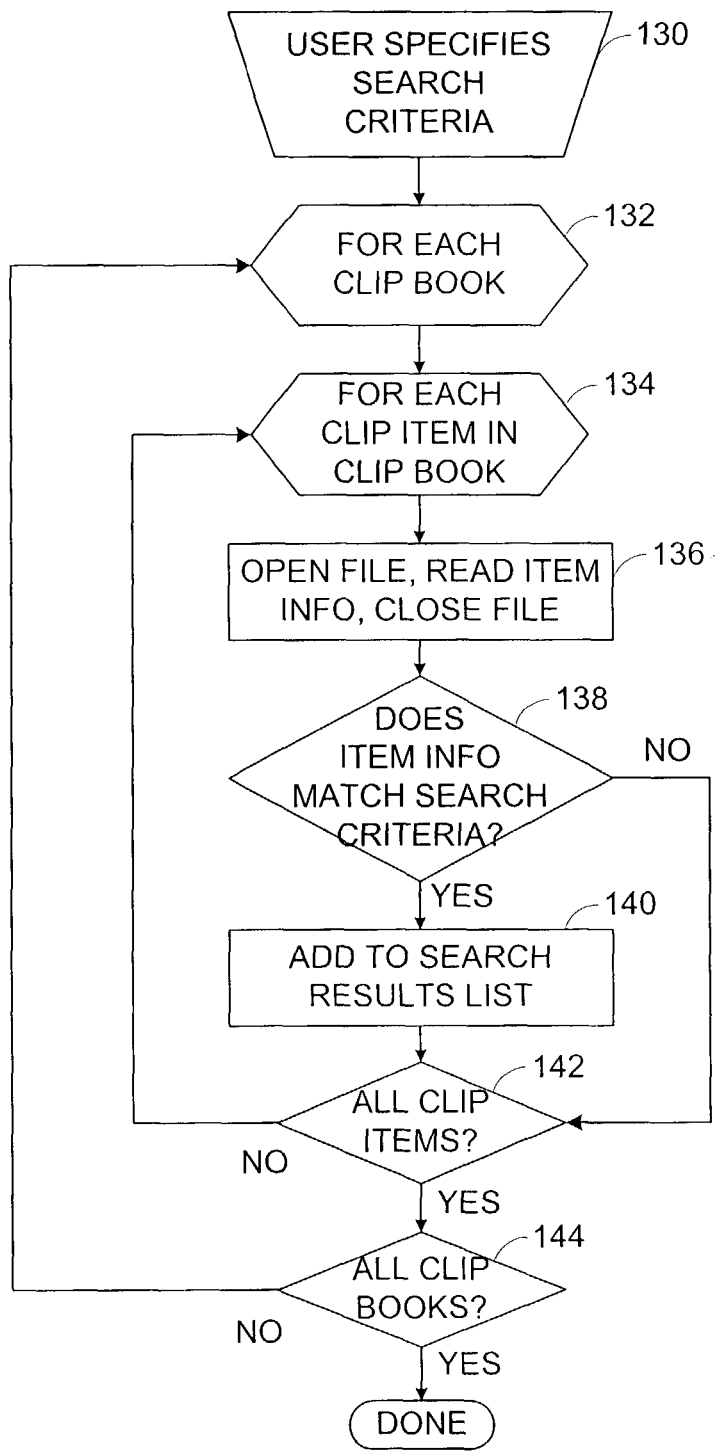
FIG. 6 is a flowchart showing an example of the operation of the searching unit.

Referring now to FIGS. 5 and 6, an example 110 of the searching unit 92 is described. This example may be suitably used for performing a simple form of searching.

The searching unit 110 comprises a searching user interface 112, a clip item enumerator 114 and a comparator 116. The searching user interface 112 receives search criteria input by the user, and provides search results to the user. The searching user interface 112 may be part of the clip book user interface 36 (FIG. 3). The clip item enumerator 114 enumerates each of relevant clip item files, opening and reading the item information and/or group information from the clip item files into memory. The comparator 116 compares the search criteria and the item information and/or group information. A comparison is typically made as to whether or not any part of the information matches the search criteria. If it does, a reference to the matched clip item is added to a search result containing a list of files for which the search is successful.

FIG. 6 shows an example of the searching operation. The user selects search criteria, e.g., the search text, indication as to whether the title, description, or both are to be searched, as well as a search range of clip items and/or clip books to be searched (130). For example, the search range may be specified as one or more clips, contiguous or not, within a particular clip book or books, one or more local and remote memories. The search range defines a finite number of clip items and clip books.

The clip item enumerator 114 then selects each clip book from the selected search range (132), one at a time, and each clip item within the selected clip book (134), one at a time. For each clip item, the clip item enumerator 114 opens the file associated with that clip item, and reads the title, description and/or key words into memory (136), depending on the search criteria. For example, if only the title is to be searched, the clip item enumerator 114 may choose to read in just the corresponding title from the clip item.

The comparator 116 compares and determines whether the title, description and/or key words contain the specified search text (138). If a match is found, a reference to the currently-selected clip item is kept, e.g., the reference is added to a search results list (140). These references are used to indicate to the user which clip item from which clip book contained the specified search text. The results may be in the form of a visual indication, as in a dialog listing the results, or saved directly out to a separate file.

This process of steps 136-140 repeats for each selected clip (142) within each specified clip book (144). Regardless of whether or not the search is successful within a clip book, the search continues until all clip items within the selected search range have been searched.

In the example shown in FIG. 6, the comparison 138 is made each time when each clip item file is opened. Alternatively, the comparison may be made for multiple clip items, e.g., after step 142 for all clip items in a same clip book, or after the step 144 for all clip items in all clip book within the selected search range.

If a selected clip item file is stored in a shared clip book in a remote memory 102, the searching unit 110 may open the clip item file in the remote memory 102 remotely. Alternatively, the searching unit 110 may request that a corresponding searching unit 104 running on a remote system having the remote memory 102 containing the shared clip book perform the file operation, i.e., opening the clip item file, reading necessary information from the file, and closing each clip file.

This search mechanism is simple, but may be potentially inefficient particularly if many clip item files need to be searched, because there are multiple file operations necessary. Accordingly, it is preferable to use a more-efficient search mechanism when efficiency is of importance.

Figure 7:
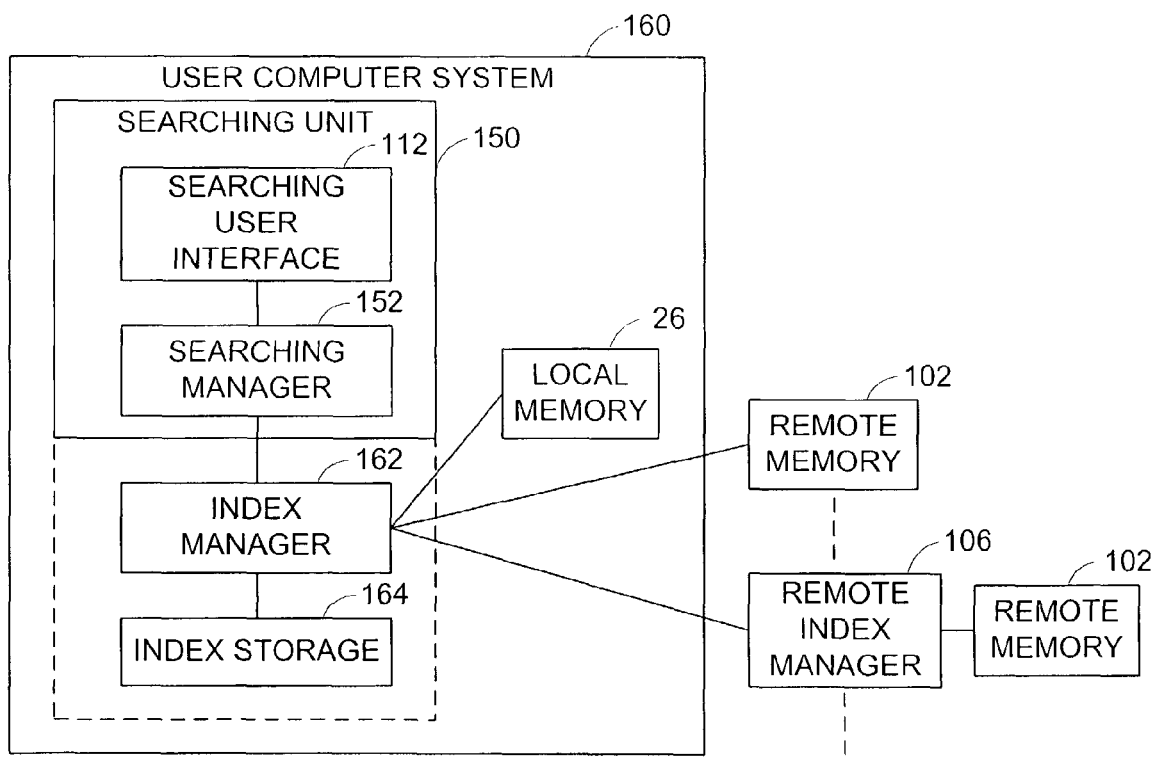
FIG. 7 is a block diagram showing another example of a searching unit.
Figure 8:
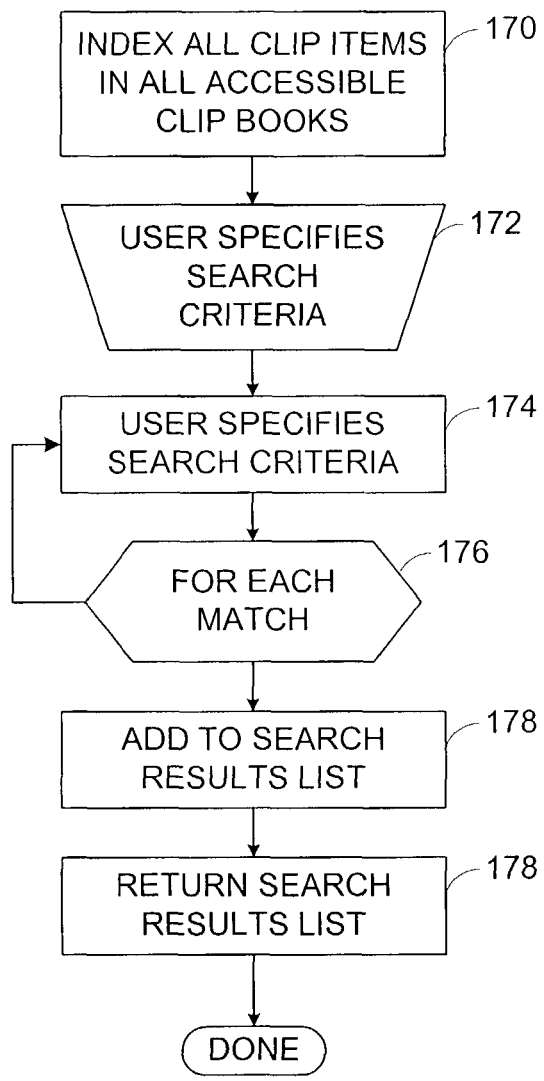
FIG. 8 is a flowchart showing an example of the operation of the searching unit.

Referring to FIGS. 7 and 8, such a more-efficient search mechanism is described. In this example, a searching unit 150 comprises a searching user interface 112 similar to that shown in FIG. 5, and a searching manager 152.

In addition to the searching unit 150, a user computer system 160 has an index manager 162 and an index storage 164. The index manager 162 indexes all available or accessible clip items in all accessible clip books in the local memory 26 and the remote memory 102, and creates an indexed search file. The indexed search file is stored in the index storage 164. The index storage 164 may be part of the local memory 26. It is typically preferable that the indexed search file is maintained locally on the user computer system 160 in the index storage 164 for maximum search performance. In order to index available clip items in remote memory 102, the index manager 162 may communicate with a remote index manager 106 and obtain an indexed search file for clip items stored in remote memory 102 that is managed by the remote index manager 106.

As the index manager 162, any mechanism may be used that provides pre-searching and pre-indexing functions for multiple files of known file formats. Some of existing file indexing tools may be suitably used. With the use of the index manager 162, a clip item search can be performed via a single call to the index manager 162, which in turn makes a simple call to read the indexed file stored in the index storage 164. The results of the search are typically returned in much less time that the searching unit 110 shown in FIG. 5.

When an existing indexing tool is used, it is desirable to use a file format that the indexing tool is capable of understanding. When a special file format is used for storing clip items, the existing indexing tool may be modified or updated to understand the special file format of the clip item files.

In the embodiment shown in FIG. 7, the index manager 162 and index storage 164 are provided separately from the searching unit 150. In a different embodiment, the index handler 162 and/or index storage 164 may be provided as part of the searching unit 150, as represented by broken lines in FIG. 7.

FIG. 8 shows an example of the searching operation carried out by the searching unit 150 and index manager 162. Prior to the user selecting the search criteria in a similar manner as described for FIG. 6, the searching unit 150 initiates a process by the index manager 162 to index the information in all accessible clip items in all accessible clip books (170). The indexing process may be part of the process carried by the searching unit 150 when the index manager 162 is provided within the searching unit 150.

Once the user has selected the search criteria (172), the searching manager 152 directly or indirectly opens the index search file, performs the search for the requested search criteria (174). The searching manager 152 may carry out this step by either directly accessing the indexed search file in the index storage 164, or sends a request to the index manager 162, indicating the search criteria, and causes the index handler 162 to perform the search. The request to the index manager 162 may be sent via software message.

Through the search mechanism of the searching manager 152 or the index manager 162, for each matching clip item (176), a reference of the matched clip item is added to a search results list (178). The search results list of clip items containing the search criteria is returned to the user (180).

Figure 9:
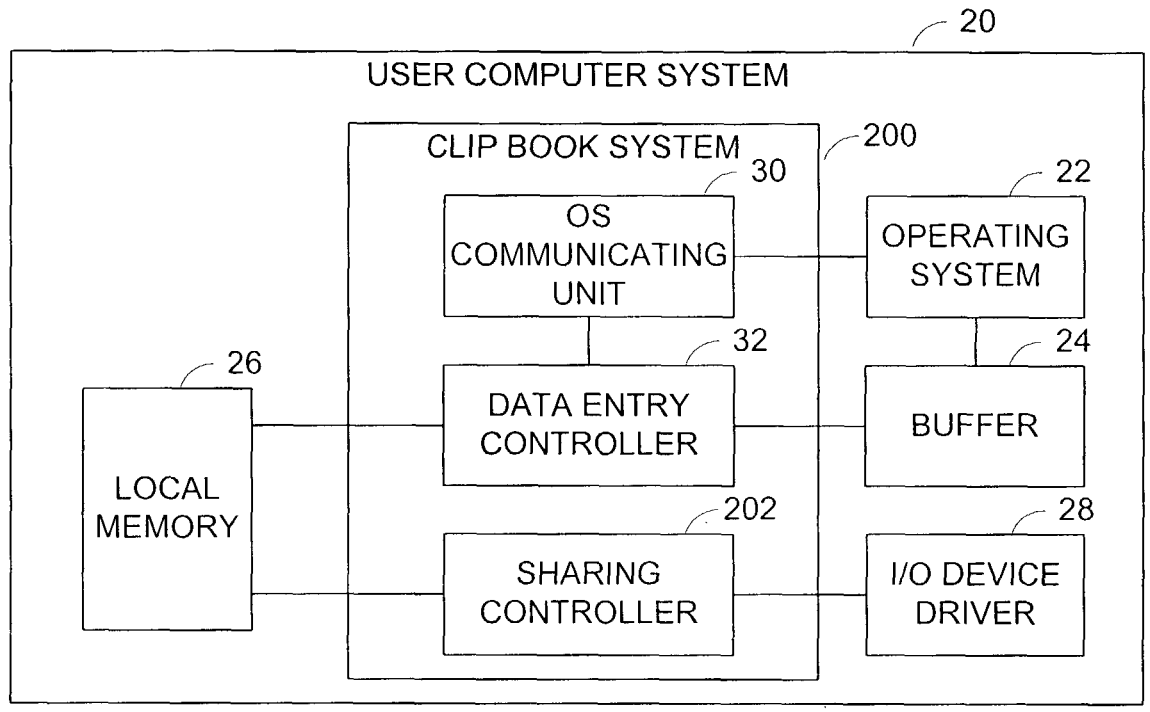
FIG. 9 is a block diagram showing a clip book system in accordance with another embodiment of the invention.

Referring now to FIG. 9, a clip book system 200 in accordance with another embodiment of the invention is described. Similar to the clip book system 10 shown in FIG. 1, the clip book system 200 is suitably used in a user computer system 20.

The clip book system 200 has an OS communicating unit 30 and a data entry controller 32 that are similar to those shown in FIG. 1. The clip book system 200 also has a sharing controller 202 for controlling selective sharing of clip items among multiple users. Typically, the user who created a clip item, i.e., the owner of the clip item, determines if the clip item should be marked as shared. Sharing control may be made in a unit of each clipboard. For example, once a clipboard is marked as shared, another user can connect to that clip book, and copy any of those clip book items that are marked as shared to any locations onto his or her system.

Figure 10:
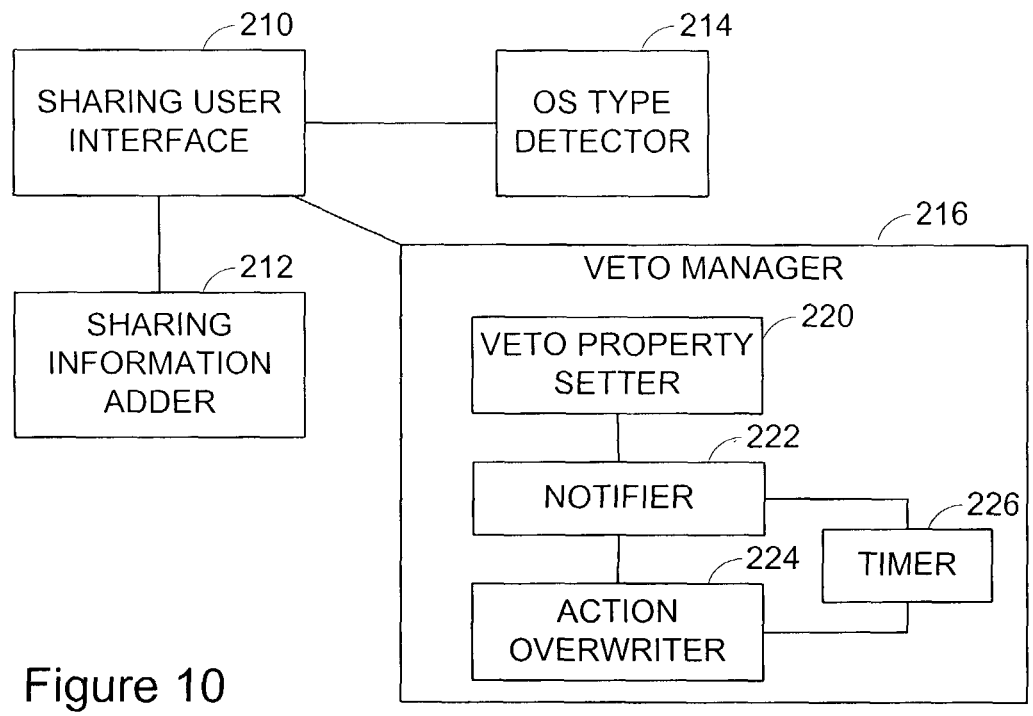
FIG. 10 is a block diagram showing an example of a sharing controller.

FIG. 10 shows an embodiment of the sharing controller 202 which has a sharing unit user interface 210 and a sharing information adder 212. The sharing unit user interface 210 allows the user to set or modify sharing properties to his/her clip book folders. The sharing information adder 212 adds the sharing properties to the clip book folder. Sharing properties may be full control, read only, read and write, and so on. Based on the sharing properties, the sharing controller 202 controls the actual sharing through, e.g., standard APIs of Windows (trademark of Microsoft Corporation).

When the clip items are stored in file folders, in order to allow the user to set the sharing properties, it is preferable to display a standard folder sharing dialog. However, often a different operating system (OS) uses a different identification (ID) to display the standard folder sharing dialog. For example, depending on which type or version of Windows (trademark of Microsoft Corporation) on which the clip book system 200 is running, there are different OS-specific IDs for the dialog template. The ID of the template depends on whether the OS is Windows 9X-based (i.e., 95, 98, 98SE, or ME) or NT-based (NT, 2000, or XP). Typically, the user is not aware of these differences. Therefore, it is preferable that the clip book system 200 automatically detects the type or version of the OS, and selects a suitable folder sharing dialog.

To this end, as shown in FIG. 10, the clip book system 200 may also have an OS type detector 214 for detecting the type or version of the operation system 22. Based on the detected type of the operation system 22, the sharing unit user interface 210 provides a suitable sharing dialog to the users. For example, if the sharing unit user interface 210 uses standard Windows folder-sharing APIs, which are available on all versions of Windows. The OS type detector 214 detects which version of Windows is running, and enables the version-specific folder sharing dialog. Once a folder is marked as 'shared' by Windows, Windows itself ensures that it is 'visible' to all versions of Windows.

By using the standard folder-sharing APIs for standard operating systems, the user can perform familiar operations to initiate the folder sharing. Also, the sharing unit 202 can allow sharing clips over different versions of the operating system.

Figure 11:
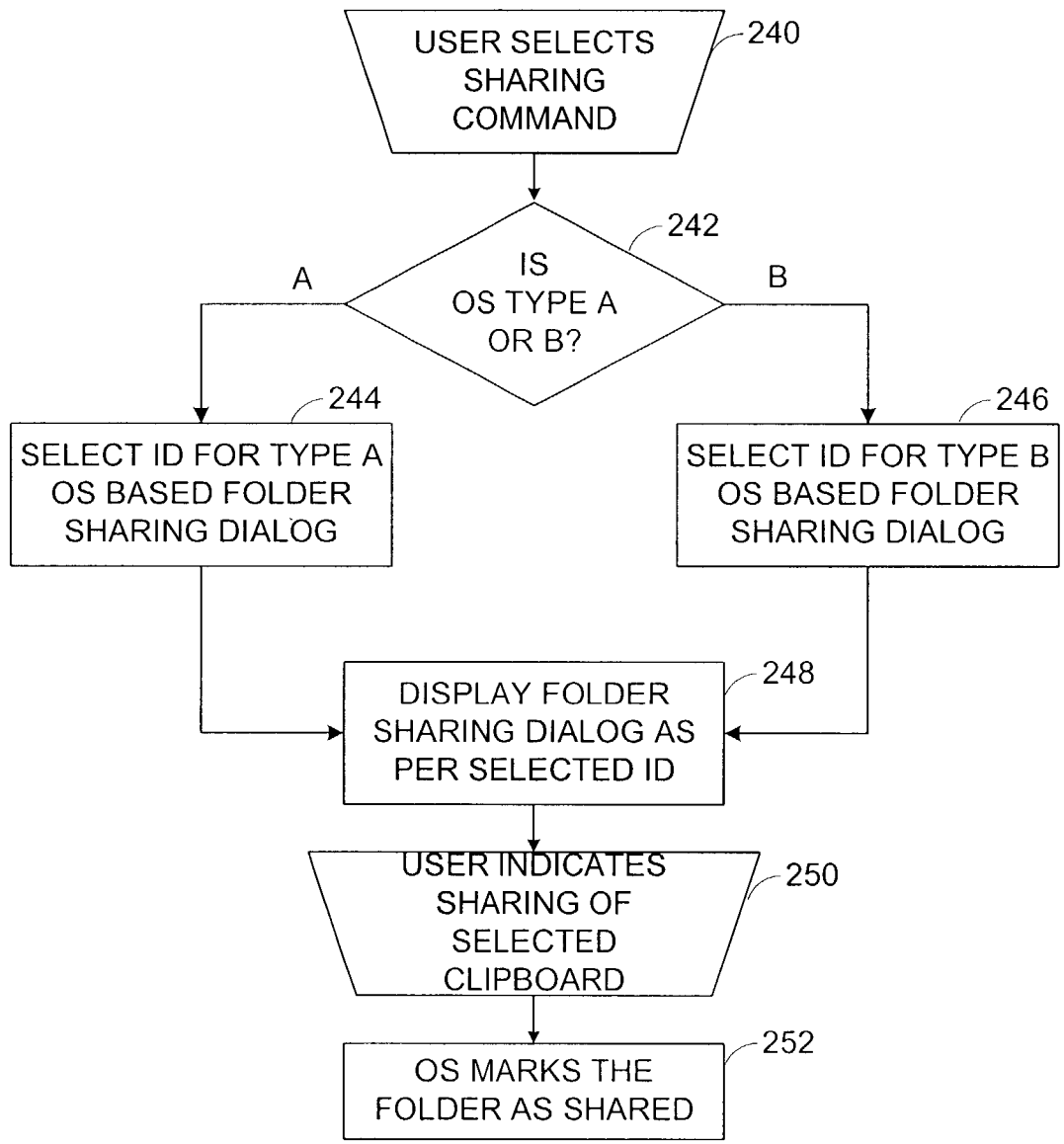
FIG. 11 is a flowchart showing an example of the operation of the sharing controller.

FIG. 11 illustrates an example of the operation of the sharing controller 202 as described above. The user adds multiple clip items to one or more of his/her clipboards, and decides to share the contents of a particular clipboard with other users. The user launches the clip book system 200, and selects a sharing command for that clipboard (240). The sharing command may be selected via menu selections from the application that the user is using.

In order to display a suitable folder-sharing dialog, the clip book system 200 automatically detects the version of the OS (242), and selects a suitable folder sharing dialog (244 or 246). Although FIG. 11 shows only types A and B, there may be more types available.

The clip book system 200 displays the folder sharing dialog based on the selected ID (248). Using the dialog, the user selects which clipboard that he/she decides to share (250). Also, the user can set other sharing properties to the selected clipboard. The user can set different permissions for each clipboard.

In response to the user's indication, the operation system marks the folder associated with the selected clipboard as shared (252).

Referring back to FIG. 10, the searching controller 202 may also have a veto manager 216. The veto manager 216 provides to users a veto prompt feature, by which a specific user may overwrite actions on a clipboard by other sharing users. The specific user is typically the owner of the clipboard or a preselected authorized user, such as an administrator of the system. The following descriptions are made with the clip owner as the specific user, as an example.

Figure 12:
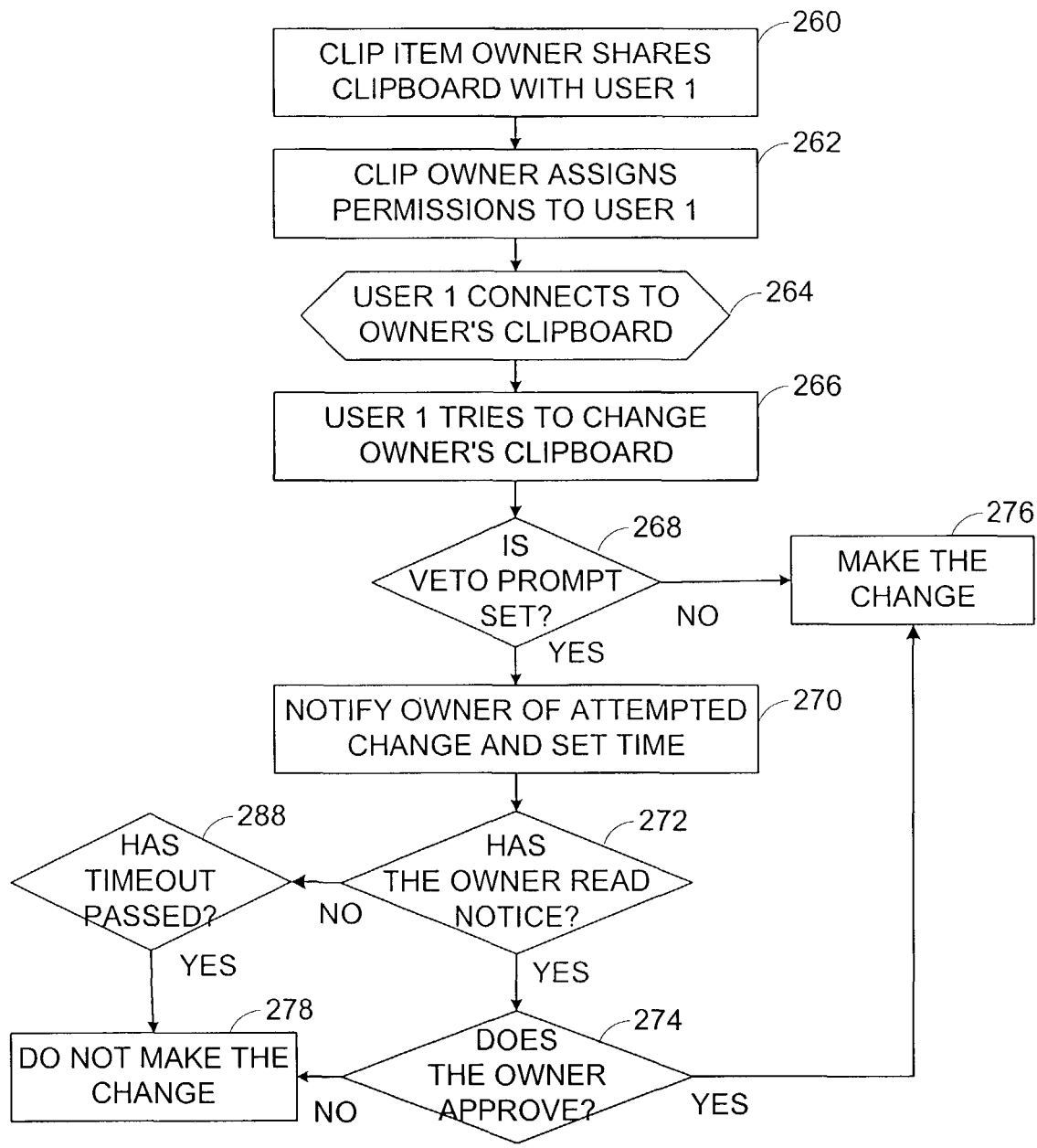
FIG. 12 is a flowchart showing an example of the operation of a veto manager.

The veto manager 216 comprises a veto property setter 220, a notifier 222, an action overwriter 224. Also, the veto manager 216 may have a timer 226. The veto manager 216 may set the veto prompt feature dependent on each clipboard Referring to FIG. 12, the veto prompt feature is further described. As described above, the user can set different permissions for each shared clipboard, such as Full Control, or Read and Edit. The veto prompt feature allows the clip owner to set a property that allows him/her to veto any changes to his/her existing clipboards, regardless of the permissions given to another user. Thus, accidental erasing or changing of clipboards against the clip owner's intention may be avoided. The clip owner can be given the opportunity of canceling any undesired actions, regardless of the permissions granted.

Where the clip owner shares a particular clipboard with a user and sets sharing properties for the clipboard (260), the owner assigns appropriate permissions to the sharing user (262). Then, the sharing user can access or connect to the clipboard as per the permissions (264). If the sharing user tries to modify the contents of the clipboard, e.g., adding a clip item to an empty space, adding a clip and overwriting an existing clip, deleting an existing clip, editing an existing clip (266), the clip book system checks if the veto prompt feature is engaged (268). If it is engaged, the veto manager 216 notifies or warns the clip owner of the change action of the sharing user and asks if the owner approves of the change action (270). If the clip owner reads the notice (272) and approves the change (274), then the veto manager 216 allows the change to be made (276) and the action is completed. If the clip owner does not approve the change (274), then the veto manager 216 cancels the change action and the change is not made (278).

Preferably, when the clip owner is notified of the attempted change, a timer of a predetermined period is set (270). If the clip owner does not respond to the notice (272) and timeout occurs (288), the veto manager 216 also cancels the change action and no change is made (278).

If the veto prompt is not set (268), the veto manager 216 allows the change to be made (276).

Figure 13:
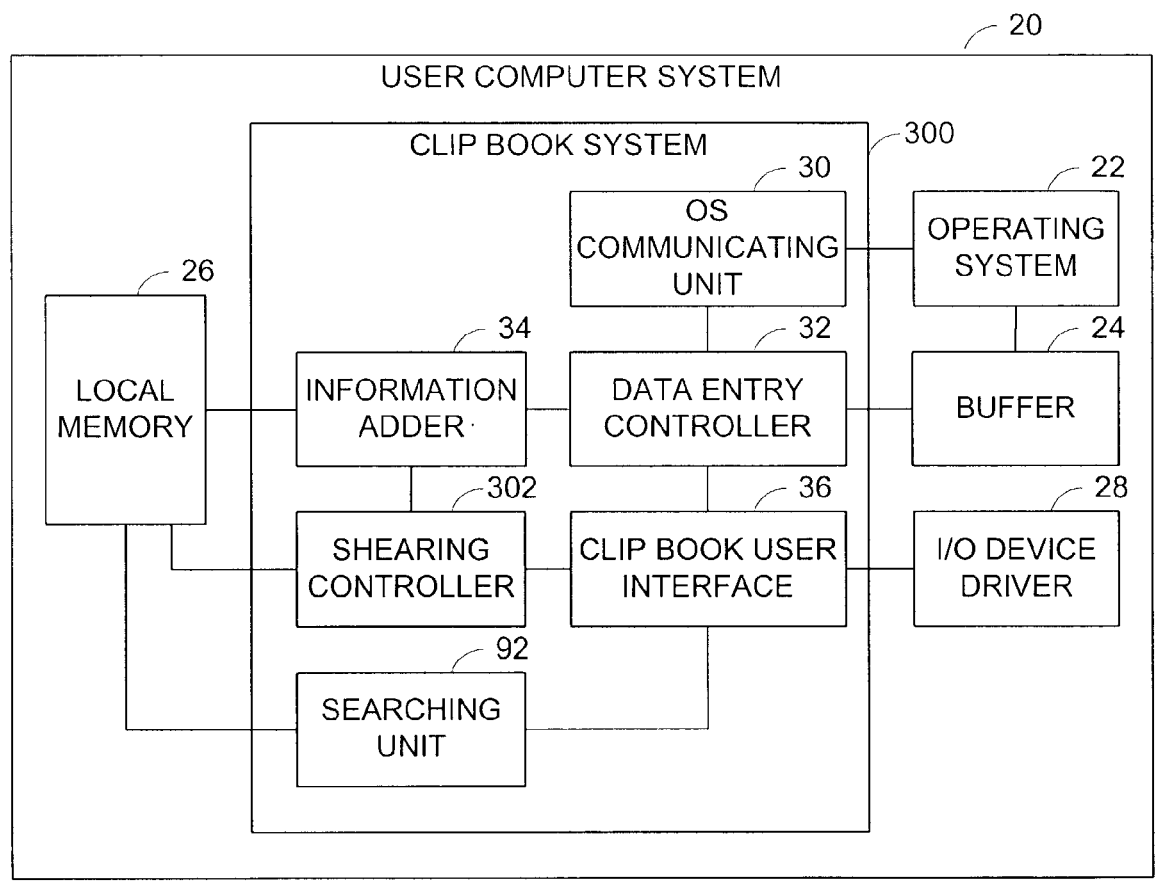
FIG. 13 is a block diagram showing a clip book system in accordance with another embodiment of the invention.

By using the veto manager 216, the clip owner can set a veto prompt for each user. If the clip owner decides to share a clipboard with a sharing user and gives the sharing user "Full Control", then the clipboard owner can still exercise a degree of control over his clip item by using the veto prompt feature. The clip owner can cancel any write/delete operations issued by the sharing user FIG. 13 shows another embodiment of clip book system 300. In this embodiment, the clip book system 300 has a sharing controller 302. The sharing controller 302 is similar to sharing controller 202 shown in FIGS. 9 and 10, but it uses clip book user interface 36, instead of using sharing user interface 210. The sharing controller 302 also uses information adder 34 to add sharing properties to clip items, instead of using sharing information adder 212.

The clip book system 300 allows multiple users on a network to easily share clipboards with each other. It may be an independent, stand-alone utility, which works seamlessly with other user's applications.

The clip book system of the present invention may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof.

The software code of the clip book system can be implementable by the creation application used to create documents. It may operate on various platform, such as the MAC, PC and Linux platform.

While particular embodiments of the present invention have been shown and described, changes and modifications may be made to such embodiments without departing from the true scope of the invention. For example, the elements of the connector unit are described separately, however, two or more elements may be provided as a single element, or one or more elements may be shared with other component in the computer systems. For example, the local memory is described as a separate element from the clip book system, but the clip book system may have its own memory for storing clip items.

What is claimed is:

1. A clip book system for storing multiple clipboards, which store multiple clip items of data in a local memory, the clip book system comprising:
    an OS communicating unit for communicating with an operating system which controls temporal buffering of each clip item in a buffer, for requesting the operating system to notify when a clip item of data is placed into the buffer and receiving notifications from the operating system;
    a data entry controller for, in response to each notification, copying each clip item of data from the buffer into a selected section of the local memory, and allowing formation of one or more groups of clip items, each group containing one or more clip items of data stored in one or more sections of the local memory;
    an information adder for allowing a user, for the copied clip item of data, to define item information and group information, the item information being a name, description or key word capable of identifying the copied clip item of data, the group information being capable of identifying a group to which the copied clip item belongs, and for adding the item information and the group information to the copied clip item of data in the local memory;
    a searching user interface for receiving search criteria input by a clip item user, the search criteria including item information of one or more desired clip items of data that the clip item user desires to receive, and for presenting a search result to the clip item user; and
    a searching unit for searching the groups of clip items for one or more desired clip items of data based on the item information of the copied clip items in the local memory and the search criteria received from the clip item user through the searching user interface, and returning the search result to the searching user interface for presenting the search result to the clip item user.

2. The clip book system as claimed in claim 1 wherein the data entry controller automatically selects a next available section as the selected section.

3. The clip book system as claimed in claim 1 further comprising a user interface for prompting the user to specify a section in the local memory as the selected section.

4. The clip book system as claimed in claim 1 wherein the information adder automatically creates the item information.

5. The clip book system as claimed in claim 1 further comprising a user interface for prompting the user to enter the group information.

6. The clip book system as claimed in claim 1, wherein the searching unit searches desired clip items of data using one or more key words of the clip items.

7. The clip book system as claimed in claim 1 wherein the search criteria includes a range of a search specifying which group and/or which memory to be searched.

8. The clip book system as claimed in claim 1 wherein the search criteria includes desired item information and/or group information.

9. The clip book system as claimed in claim 1 wherein the searching unit comprises:
    an item enumerator for reading item information of relevant clip items of data available in the local memory; and
    a comparator for comparing the search criteria and the item information read by the item enumerator, and generating a search result based on the comparison.

10. The clip book system as claimed in claim 9 wherein the item enumerator is capable of communicating with a remote item enumerator which reads item information of remote relevant clipboards of data available in its associated remote memory, for requesting the item information of the remote relevant clip items.

11. The clip book system as claimed in claim 9 wherein the item enumerator further reads item information of remote relevant clipboards available in a remote memory.

12. The clip book system as claimed in claim 9 wherein the item criteria includes a range of search and the item enumerator determines the relevant clip items based on the range of search.

13. The clip book system as claimed in claim 1 wherein the searching unit comprises:
   an index manager for generating index of clip items of data available in the local memory;
   an index storage for storing the index of available clip items of data; and
   a searching manager for searching the index storage based on the search criteria.

14. The clip book system as claimed in claim 13 wherein the index manager is capable of communicating with a remote index manager which manages index of remote clip items of data available in its associated remote memory, for requesting a search result within the associated remote memory based on the search criteria.

15. The clip book system as claimed in claim 13 wherein the index manager further manages index of remote clip items of data available in one or more remote memories, and entering the index of the remote clip items into the index storage.

16. The clip book system as claimed in claim 1 wherein the searching unit comprises:
   a searching manager for requesting a search based on the search criteria to an index manager managing index of clip items of data available in the local memory, and receiving a search result.

17. The clip book system as claimed in claim 1 further comprising a sharing controller for setting a sharing property to the copied clip item of data, the sharing property selectively allowing the copied clip item of data to be shared by one or more other users.

18. A clip book system for storing multiple clip items of data in a local memory, the clip book system comprising:
   an OS communicating unit for communicating with an operating system which controls temporal buffering of each clip item in a buffer, for requesting the operating system to notify when a clip item of data is placed into the buffer and receiving notifications from the operating system;
   a data entry controller for, in response to each notification, copying each clip item of data from the buffer into a selected section of the local memory, and allowing formation of one or more groups of clip items, each group containing one or more clip items of data stored in one or more sections of the local memory;
   an information adder for allowing a user, for the copied clip item of data, to define item information and group information, the item information being a name, description or key word capable of identifying the copied clip item of data, the group information being capable of identifying a group to which the copied clip item belongs, and for adding the item information and the group information to the copied clip item of data in the local memory;
   a sharing controller for setting a sharing property to the copied clip item of data, the sharing property selectively allowing the copied clip item of data in the local memory to be accessed by one or more other users;
   a searching user interface for receiving search criteria input by a clip item user, the search criteria including item information of one or more desired clip items of data that the clip item user desires to receive, and for presenting a search result to the clip item user; and
   a searching unit for searching the groups of clip items for one or more desired clip items of data based on the item information of the copied clip items in the local memory or other local memory storing shared clip items and the search criteria received from the clip item user through the searching user interface, and returning the search result to the searching user interface for presenting the search result to the clip item user.

19. The clip book system as claimed in claim 18 wherein the sharing controller comprises:
   a sharing user interface for receiving sharing information input by a user, the sharing information defining the sharing property to be set to an associated clipboard; and
   a sharing information adder for adding the sharing information to the associated clipboard.

20. The clip book system as claimed in claim 18 wherein the sharing controller further comprises:
   a veto manager for providing a veto prompt property to a selected clipboard, the veto prompt property allowing a preselected user to control the sharing property of the selected clip item.

21. The clip book system as claimed in claim 20 wherein the veto manager comprises:
   a veto property setter for setting the veto prompt property to the selected clipboard;
   a notifier for detecting an attempt to change the selected clipboard by a shared user, and notifying the preselected user of the attempt, and receiving a preferred action input by the preselected user; and
   an action overwriter for overwriting an action of changing with the preferred action input by the preselected user.

22. The clip book system as claimed in claim 21 wherein the veto manager further comprises a timer for forcing the action overwriter to take a predetermined action when a preset time period expires after the notification by the notifier.

23. The clip book system as claimed in claim 18 further comprising
   an OS type detector for detecting a type of the operating system used for controlling buffering of each clip item of data; and
   wherein the sharing user interface uses a user interface dialog based on the detected type of the operating system.

24. The method as claimed in claim 18 wherein the sharing step further comprises the steps of:
   setting the veto prompt property to the selected clipboard;
   detecting an attempt to change the selected clipboard by a shared user;
   notifying the preselected user of the attempt;
   receiving a preferred action input by the preselected user; and
   overwriting an action of changing with the preferred action input by the preselected user.

25. The method as claimed in claim 24 wherein the overwriting step takes place when a preset time period expires after the notification by the notifier.

26. A method for storing multiple clip items of data in a local memory, the method comprising the steps of:
   requesting an operating system, which controls temporal buffering of each clip item in a buffer, to notify when a clip item of data is placed into the buffer;
   receiving a notification from the operating system;
   copying each clip item of data from the buffer into a selected section of the local memory in response to each notification;
   allowing formation of one or more groups of clip items, each group containing one or more clip items of data stored in one or more sections of the local memory;
   allowing a user, for the copied clip item of data, to define item information and group information, the item information being a name, description or key word capable of identifying the copied clip item of data, the group information being capable of identifying a group to which the copied clip item belongs;

adding the item information defined by the user to the copied clip item of data in the local memory;

adding group information to the groups of clip items;

receiving search criteria input by a clip item user, the search criteria including item information of one or more desired clip items of data that the clip item user desired to receive;

searching the groups of clip items for one or more desired clip items of data based on the item information of the copied clip items in the local memory and the search criteria received from the clip item user through the searching user interface; and presenting a search result to the clip item user.

27. The method as claimed in claim 26 wherein the copying step automatically selects a next available section as the selected section.

28. The method as claimed in claim 26 further comprising a step of prompting the user to specify a section in the local memory as the selected section.

29. The method as claimed in claim 26 wherein the adding step automatically creates the item information.

30. The method as claimed in claim 26 further comprising a step of prompting the user to enter the group information.

31. The method as claimed in claim 26 wherein
the searching step searches desired clip items of data using the key words of the clip items.

32. The method as claimed in claim 26 wherein the searching step comprises the steps of:

reading item information of relevant clip items of data available in the local memory;

comparing the search criteria and the item information read by the item enumerator; and generating a search result based on the comparison.

33. The method as claimed in claim 26 wherein the searching step comprises the steps of:

generating index of clip items of data available in the local memory;

storing the index of available clip items of data; and searching the index storage based on the search criteria.

34. The method as claimed in claim 26 wherein the searching step comprises the steps of:

requesting a search based on the search criteria to an index manager managing index of clip items of data available in a remote memory; and receiving a search result.

35. The method as claimed in claim 26 further comprising a step of selectively allowing the copied clip item of data to be shared by one or more other users.

36. The method as claimed in claim 35 wherein the sharing step comprises the steps of:

receiving sharing information input by a user, the sharing information defining the sharing property to be set to an associated clipboard; and adding the sharing information to the associated clipboard.

37. The method as claimed in claim 26 further comprising the steps of:

detecting a type of the operating system used for controlling buffering of each clip item of data; and providing a sharing user interface dialog based on the detected type of the operating system.

38. A computer readable medium storing the instructions and/or statements for use in the execution in a computer of a method for storing multiple clip items of data in a local memory, the method comprising the steps of:

requesting an operating system, which controls temporal buffering of each clip item in a buffer, to notify when a clip item of data is placed into the buffer;

receiving a notification from the operating system;

copying each clip item of data from the buffer into a selected section of the local memory in response to each notification;

allowing formation of one or more groups of clip items, each group containing one or more clip items of data stored in one or more sections of the local memory;

allowing a user, for the copied clip item of data, to define item information and group information, the item information being a name, description or key word capable of identifying the copied clip item of data, the group information being capable of identifying a group to which the copied clip item belongs;

adding the item information defined by the user to the copied clip item of data in the local memory;

adding group information to the groups of clip items;

receiving search criteria input by a clip item user, the search criteria including item information of one or more desired clip items of data that the clip item user desired to receive;

searching the groups of clip items for one or more desired clip items of data based on the item information of the copied clip items in the local memory and the search criteria received from the clip item user through the searching user interface; and presenting a search result to the clip item user.

39. A computer program product for use in the execution in a computer of a method for storing multiple clip items of data in a local memory, the computer program product comprising:

a module for requesting an operating system, which controls temporal buffering of each clip item in a buffer, to notify when a clip item of data is placed into the buffer;

a module for receiving a notification from the operating system;

a module for copying each clip item of data from the buffer into a selected section of the local memory in response to each notification;

a module for allowing formation of one or more groups of clip items, each group containing one or more clip items of data stored in one or more sections of the local memory;

a module for allowing a user, for the copied clip item of data, to define item information and group information, the item information being a name, description or key word capable of identifying the copied clip item of data, the group information being capable of identifying a group to which the copied clip item belongs;

a module for adding the item information defined by the user to the copied clip item of data in the local memory;

a module for adding group information to the groups of clip items;

a module for receiving search criteria input by a clip item user, the search criteria including item information of one or more desired clip items of data that the clip item user desired to receive;

a module for searching the groups of clip items for one or more desired clip items of data based on the item information of the copied clip items in the local memory and the search criteria received from the clip item user through the searching user interface; and a module for presenting a search result to the clip item user.

* * * * *

UNITED STATES PATENT AND TRADEMARK OFFICE
CERTIFICATE OF CORRECTION

| | |
|---|---|
| PATENT NO. | : 8,782,545 B2 |
| APPLICATION NO. | : 10/303399 |
| DATED | : July 15, 2014 |
| INVENTOR(S) | : Creasor et al. |

It is certified that error appears in the above-identified patent and that said Letters Patent is hereby corrected as shown below:

In the Specification

Column 2, Lines 27-30, please delete

"In accordance with another aspect of the present invention, there are provided electronic signals for use in the execution in a computer of the method for storing multiple clip items of data in a local memory."

and insert

--In accordance with another aspect of the present invention, there is provided a computer readable medium storing the instructions and/or statements for use in the execution in a computer of the method for storing multiple clip items of data in a local memory.-- therefor;

Column 2, Line 32, please delete "is" and insert --are-- therefor.

Signed and Sealed this
Twenty-first Day of October, 2014

Michelle K. Lee
*Deputy Director of the United States Patent and Trademark Office*